(12) United States Patent
Endo et al.

(10) Patent No.: US 10,197,111 B2
(45) Date of Patent: Feb. 5, 2019

(54) INSTALLATION STRUCTURE OF ONE-WAY CLUTCH

(71) Applicant: Toyota Jidosha Kabushiki Kaisha, Toyota-shi (JP)

(72) Inventors: Takahito Endo, Sunto-gun (JP); Seitaro Nobuyasu, Susono (JP); Yosuke Suzuki, Hadano (JP); Koichi Kato, Susono (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 244 days.

(21) Appl. No.: 15/171,907

(22) Filed: Jun. 2, 2016

(65) Prior Publication Data
US 2016/0356323 A1 Dec. 8, 2016

(30) Foreign Application Priority Data
Jun. 2, 2015 (JP) ................................. 2015-112110

(51) Int. Cl.
| F02N 15/02 | (2006.01) |
| F16D 41/12 | (2006.01) |
| B60K 6/365 | (2007.10) |
| B60K 6/30 | (2007.10) |
(Continued)

(52) U.S. Cl.
CPC ................ *F16D 41/12* (2013.01); *B60K 6/30* (2013.01); *B60K 6/365* (2013.01); *B60K 6/383* (2013.01); *B60K 6/445* (2013.01); *B60Y 2200/92* (2013.01); *B60Y 2400/427* (2013.01); *F16D 2300/12* (2013.01); *F16D 2300/22* (2013.01);
(Continued)

(58) Field of Classification Search
None
See application file for complete search history.

(56) References Cited

U.S. PATENT DOCUMENTS

| 2011/0272236 A1* | 11/2011 | Okazaki | .................. F16D 13/56 192/66.31 |
| 2015/0159707 A1* | 6/2015 | Boelling | ............... F16F 15/124 192/45.003 |
| 2016/0258496 A1* | 9/2016 | Nobuyasu | ............. F16D 41/185 |

FOREIGN PATENT DOCUMENTS

| JP | 2007-032498 | 2/2007 |
| JP | 2008-223704 A | 9/2008 |
| JP | 2010-106956 A | 5/2010 |

* cited by examiner

*Primary Examiner* — Robert W Hodge
*Assistant Examiner* — Ryan P Dodd
(74) *Attorney, Agent, or Firm* — Oblon, McClelland, Maier & Neustadt, L.L.P.

(57) ABSTRACT

An installation structure of a one-way clutch in which torque transmission is limited to one direction includes a flywheel, first and second rotary structures, housing and stopper plates, and a rivet. The first rotary structure is arranged coaxially with the flywheel while connected to an engine block. The second rotary structure is arranged coaxially with the first rotary structure while connected to the flywheel. The housing plate is disposed between the flywheel and the first and second rotary structures and arranged coaxially while connected to the second rotary structure. The stopper plate is attached to the second rotary structure to hold first rotary structure with the housing plate. The rivet fastens the stopper plate, the second rotary structure, and the housing plate. A first clearance between one face of the flywheel and a top face of a head of the rivet is narrower than a thickness of the stopper plate.

3 Claims, 6 Drawing Sheets

(51) Int. Cl.
*B60K 6/383* (2007.10)
*B60K 6/445* (2007.10)

(52) U.S. Cl.
CPC .......... *Y10S 903/91* (2013.01); *Y10S 903/913* (2013.01); *Y10S 903/96* (2013.01)

INSTALLATION STRUCTURE OF ONE-WAY CLUTCH

CROSS-REFERENCE TO RELATED APPLICATIONS

The present application claims the benefit of priority to Japanese Patent Application No. 2015-112110 filed on Jun. 2, 2015 with the Japanese Patent Office, the entire contents of which are incorporated herein by reference in entirety.

BACKGROUND

Field of the Disclosure

The present disclosure relates to the art of an installation structure of a one-way clutch in which torque transmission is limited to one direction.

Discussion of the Related Art

JP-A-2008-223704 describes one example of a one way clutch fitted onto an output shaft of an engine. According to the teachings of JP-A-2008-223704, sprags are arranged between an outer race formed around a disc plate and an inner race fitted onto an outer race of a bearing supporting the one-way clutch. In the one-way clutch taught by JP-A-2008-223704, therefore, axial displacement of the outer race and the inner race is restricted by the disc plate and the bearing.

In turn, JP-A-2010-106956 describes a roller type one-way clutch comprising an outer race, an inner race and a roller disposed between the outer race and the inner race. According to the teachings of JP-A-2010-106956, the outer race is attached to a disc plate to be connected to a crank shaft.

JP-A-2007-32498 also describes a one-way clutch disposed between an engine block and a flywheel. According to the teachings of JP-A-2007-32498, the one-way clutch is disposed between an outer race integrated with a supporting disc opposed to a flywheel, and an inner race integrated with a disc portion of a ring gear.

According to the teachings of JP-A-2010-106956, the outer race is attached to a disc plate by a rivet placed in through holes of those members, and a tail of the rivet opposite a head is deformed. However, if the tail of the rivet is not expanded suitably, or if the head or the tail of the rivet falls out, the outer race and the disc plate would be loosened to cause malfunction of the one-way clutch. Such malfunction of the one-way clutches taught by JP-A-2008-223704 and JP-A-2007-32498 may also be caused by an imperfect expansion of the tail of the rivet or a fall off of the rivet head or tail.

SUMMARY

Aspects of the present disclosure has been conceived noting the foregoing technical problems, and it is therefore an object of the present disclosure is to provide an installation structure of a one-way clutch that can prevent malfunction of the one-way clutch caused by a damage of the rivet.

The installation structure according to an illustrative example is applied to a one-way clutch in which torque transmission is limited to one direction, including a flywheel, a first rotary structure, a second rotary structure, a housing plate, a stopper plate, and a rivet. The first rotary structure is arranged coaxially with the flywheel while being connected to an engine block. The second rotary structure is arranged coaxially with the first rotary structure while being connected to the flywheel. The housing plate is disposed between the flywheel and the first and second rotary structures and arranged coaxially while being connected to the second rotary structure. The stopper plate is attached to the second rotary structure to hold first rotary structure with the housing plate. The rivet fastens the stopper plate, the second rotary structure, and the housing plate. In order to achieve the above-explained objective, according to the illustrative example, a first clearance between one face of the flywheel and a top face of a head of the rivet is reduced to be narrower than a thickness of the stopper plate.

In the one-way clutch according to the illustrative example, a second clearance between the flywheel, except for at a portion of the flywheel opposed to the head of the rivet, and the housing plate is narrower than a thickness of the head of the rivet.

The installation structure according to the illustrative example is further provided with a chamber formed on the flywheel to hold the head of the rivet. Specifically, the above-mentioned first clearance is a clearance between a bottom face of the chamber and the top face of the head of the rivet.

Thus, according to the illustrative example, the first clearance between one face of the flywheel and the top face of a head of the rivet is reduced to be narrower than a thickness of the stopper plate. According to the illustrative example, therefore, the head of the rivet will come into abutment with the flywheel if the rivet begins to come out of through holes of the stopper plate, the second rotary structure, and the housing plate toward the flywheel due to fall-off of an expanded tail of the rivet. In this situation, the tail end of the rivet may remain within the through hole of the stopper plate. For this reason, the stopper plate is allowed to rotate integrally with the housing plate and the second rotary structure even if the rivet begins to come out of the through holes of those members to prevent breakdown and malfunction of the one-way clutch.

In addition, according to the illustrative example, the second clearance between the inner face of the flywheel and the housing plate is narrower than the thickness of the head of the rivet. That is, if the head of the rivet falls off, the detached head may remain in the chamber of the flywheel. According to the illustrative example, therefore, jamming of the rotary structures will not be caused by the detached head so that malfunction of the one-way clutch can be prevented.

Further, since the head of the rivet is held in the chamber of the flywheel, an axial length, i.e., a thickness of the one-way clutch can be shortened or thinned.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE ILLUSTRATIVE EMBODIMENTS

Figure 6:
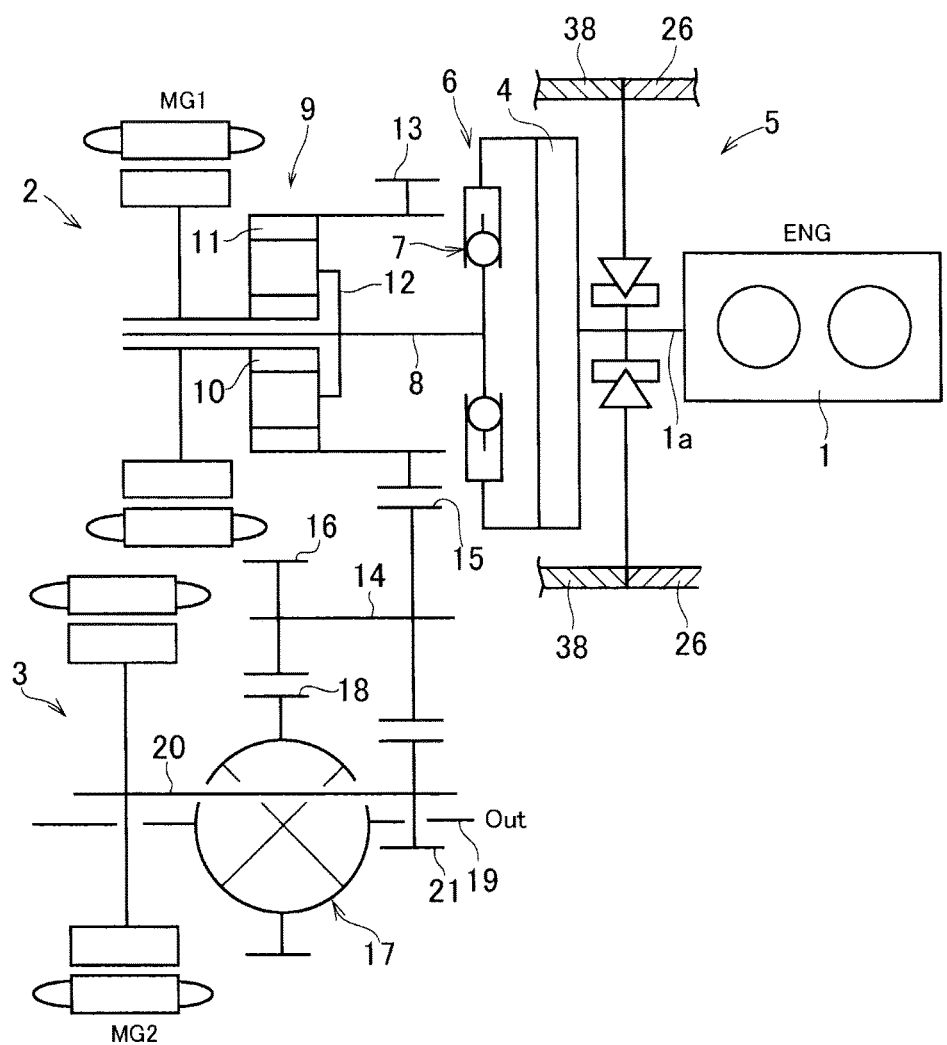
FIG. 6 is a schematic diagram showing one example of a powertrain having the one-way clutch according to the illustrative example.

Referring now to FIG. 6, there is shown one example of a powertrain in which the one-way clutch according to an illustrative example is arranged. A prime mover of the powertrain shown in FIG. 6 includes an engine (ENG) 1, a first motor (MG1) 2 and a second motor (MG2) 3, and a flywheel 4 is fitted onto an output (or crank) shaft 1a. In order to prevent an inverse rotation of the output shaft 1a of the engine 1 together with the flywheel 4, a one-way clutch 5 is also fitted onto the output shaft 1a between the flywheel 4 and the engine 1.

A damper device 7 is connected to the flywheel 4 through a torque limiter 6. In the torque limiter 6, a drive plate and a driven plate are brought into frictional contact to each other, and those plates are allowed to rotate relatively from each other when the drive plate is rotated by a torque greater than the friction acting therebetween. An input shaft 8 is connected to an input element of a power distribution device 9 to deliver torque thereto.

In the example shown in FIG. 6, a single-pinion planetary gear unit is employed as the power distribution device 9. Specifically, the power distribution device 9 comprises a sun gear 10 as an external gear, a ring gear 11 as an internal gear placed concentrically with the sun gear 10, pinion gears disposed between the sun gear 10 and the ring gear 11 while being meshed with both gears, and a carrier 12 supporting the pinion gears while allowing to rotate and revolve around the sun gear 10. The first motor 2 has a generating function, and it is connected to the sun gear 10 of the power distribution device 9 from an opposite side of the engine 1. In the power distribution device 9, the ring gear 11 is connected to an output gear 13 to serve as an output element, and the carrier 12 is connected to the input shaft 8 to serve as an input element.

A driven gear 15 is fitted onto one end of a counter shaft 14 extending parallel to the input shaft 8 while being meshed with the output gear 13, and a drive gear 16 is fitted onto the other end of the counter shaft 14 while being meshed with a ring gear 18 of a differential gear unit 17 adapted to distribute torque to both drive shafts 19.

The second motor 3 also has a generating function, and a drive gear 21 is fitted onto a rotor shaft 20 of the second motor 3 extending parallel to the input shaft 8 and the counter shaft 14 while being meshed with the driven gear 15. The first motor 2 is electrically connected with the second motor 3 to activate the second motor 3 by an electric power generated by the first motor 2, and an output torque of the second motor 3 is added to a torque delivered from the output gear 13 to the differential gear unit 17.

Figure 2:
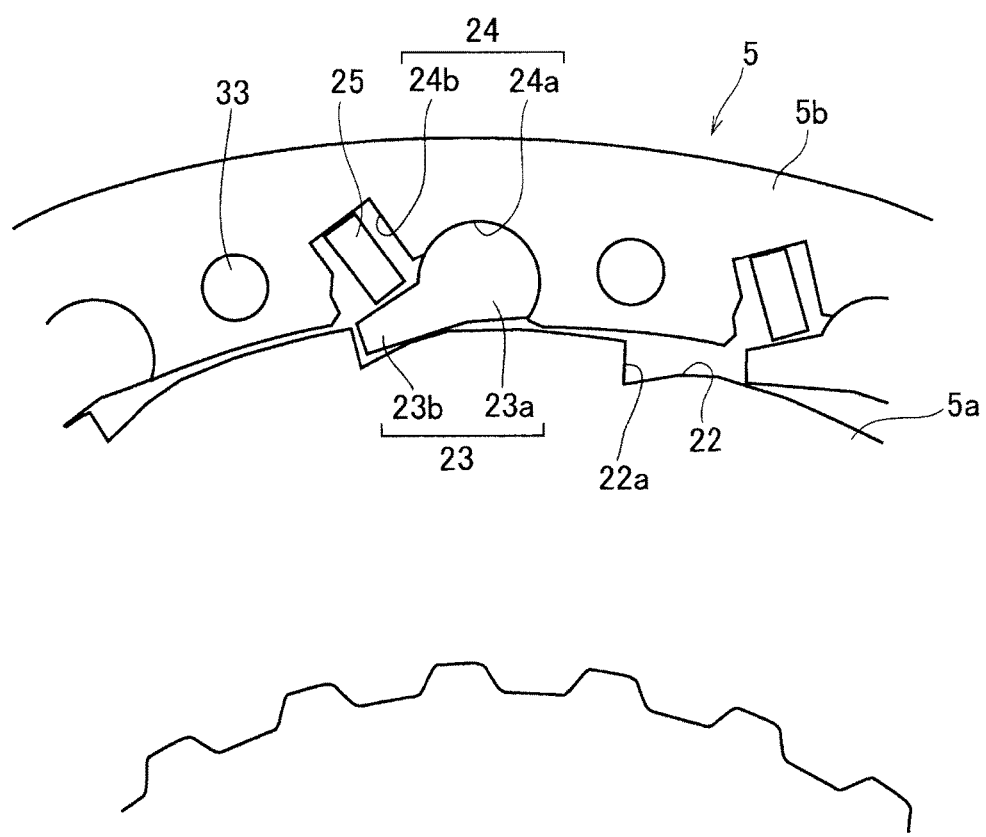
FIG. 2 is a partial front view of the one-way clutch according to the illustrative example.

Turning to FIG. 2, there is shown one example of a structure of the one-way clutch 5. As illustrated in FIG. 2, the one-way clutch 5 comprises an inner race 5a and an outer race 5b arranged concentrically with each other, and a plurality of notches 22 are formed on an outer circumference of the inner race 5a. Specifically, each of the notches 22 individually comprises a curved face extending inwardly from the outer circumference of the inner race 5a, and a flat stopper wall 22a extending radially outwardly from a bottom of a notch 22. On the other hand, a same number of depressions 24 as the notches 22 are formed on the inner circumference of the outer race 5b. Specifically, each depression 24 comprises a rounded sprag holder 24a and a rectangular spring holder 24b. In order to prevent a counter rotation of the output shaft 1a of the engine 1, a same number of sprags 23 as the notches 22 and the depressions 24 are interposed between the inner race 5a and the outer race 5b. To this end, each of the sprags 23 individually comprises a rounded base portion 23a and a strut 23b protruding from the base portion 23a. Specifically, the base portion 23a of a sprag 23 is fitted into each of the sprag holders 24a in a pivotal manner, and a spring 25 as a coil spring is held in the spring holder 24b to push the strut 23b of the sprag 23 radially inwardly.

According to the example shown in FIG. 2, a leading end of the strut 23b of the sprag 23 is pushed inwardly by an elastic force of the spring 25 to be brought into abutment with the stopper wall 22a of the notch 22 when the outer race 5b is rotated in a direction opposite to the rotational direction of the engine 1 (i.e., counterclockwise in FIG. 2). By contrast, when the outer race 5b is rotated by the torque of the engine 1 (i.e., clockwise in FIG. 2), the strut 23b of the sprag 23 is pushed outwardly by the curved face of the notch 22 against the elastic force of the spring 25 to be brought into disengagement from the stopper wall 22a. Consequently, the one-way clutch 5 is brought into an overrunning mode in which the outer race 5b is allowed to rotate relatively with respect to the inner race 5a.

Figure 3:
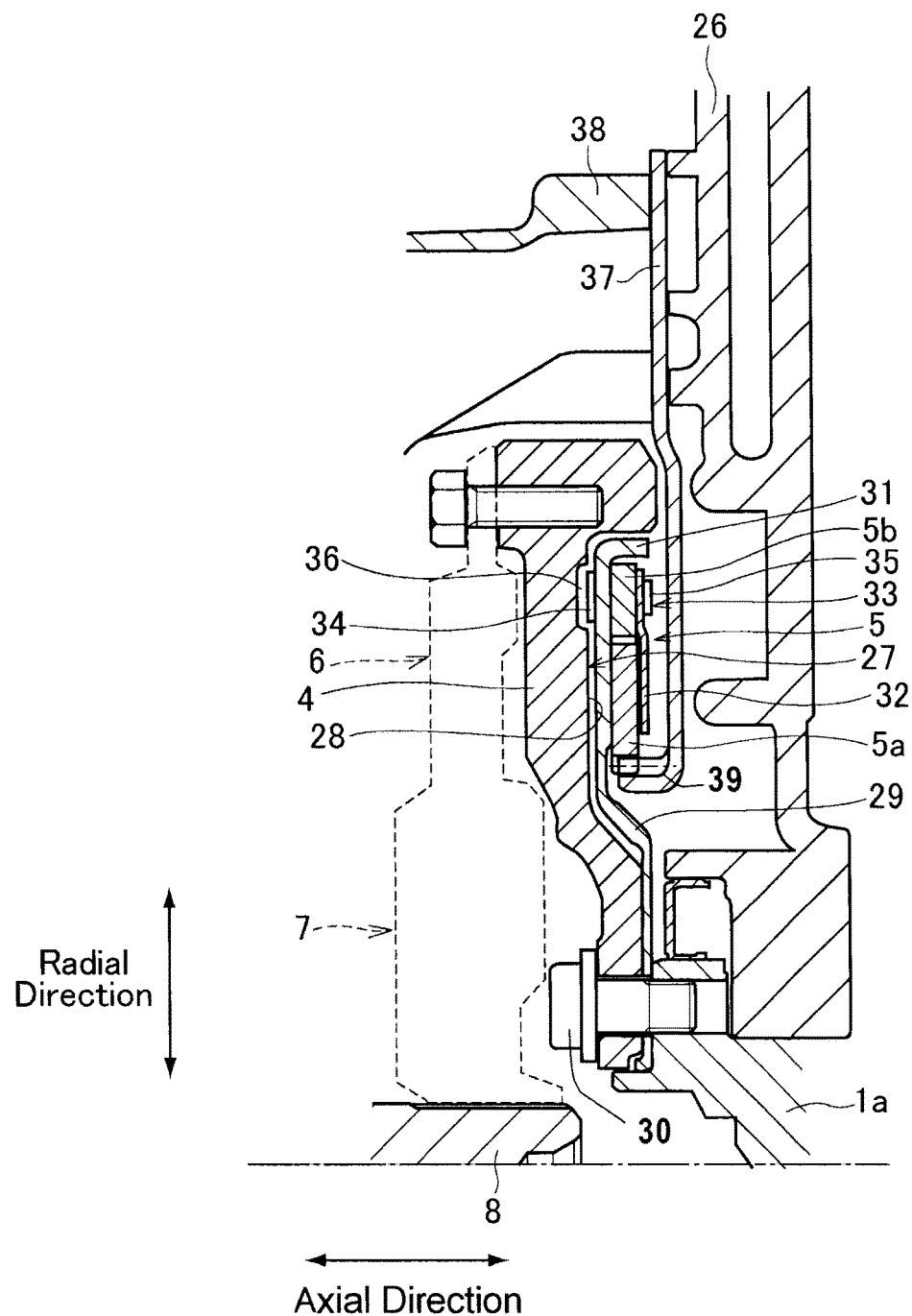
FIG. 3 is a cross-sectional view of the installation structure of the one-way clutch according to the illustrative example.

Turning to FIG. 3, there is shown the installation structure of the one-way clutch 5 according to the illustrative example. As illustrated in FIG. 3, the one-way clutch 5 is disposed between an engine block 26 and the flywheel 4, and the inner race 5a is fixed in such a manner not to be rotated. The flywheel 4 has an annular depression 27 on a face opposed to the engine block 26, and the one-way clutch 5 is held in the annular depression 27. A housing plate 29 contoured with the annular depression 27 of the flywheel 4 is also fitted onto the output shaft 1a of the engine 1 while keeping a slight clearance from an inner face 28 of the annular depression 27, and fixed to the output shaft 1a together with the flywheel 4 by a bolt 30.

A circumferential edge of the housing plate 29 is bent at a substantially right angle toward the engine block 26 to form an end wall 31, and the outer race 5b is attached to the housing plate 29 in the vicinity of the end wall 31. In order to prevent axial movement of the inner race 5a, an annular stopper plate 32 is attached to the outer circumference of the outer race 5b. To this end, the stopper plate 32 has a sufficient width to hold the inner race 5a with the housing plate 29.

Specifically, the outer race 5b and the stopper plate 32 are fixed to the housing plate 29 by a rivet 33. To this end, a through hole is individually formed on the housing plate 29, the outer race 5b and the stopper plate 32 at a radially same level, and the rivet 33 is placed in the aligned through holes from the housing plate 29 side. A head 34 of the rivet 33 is brought into close contact to the housing plate 29 while a tail 35 of the rivet 33 is upset to be expanded so that the outer race 5b and the stopper plate 32 are integrated with the housing plate 29.

Figure 4:
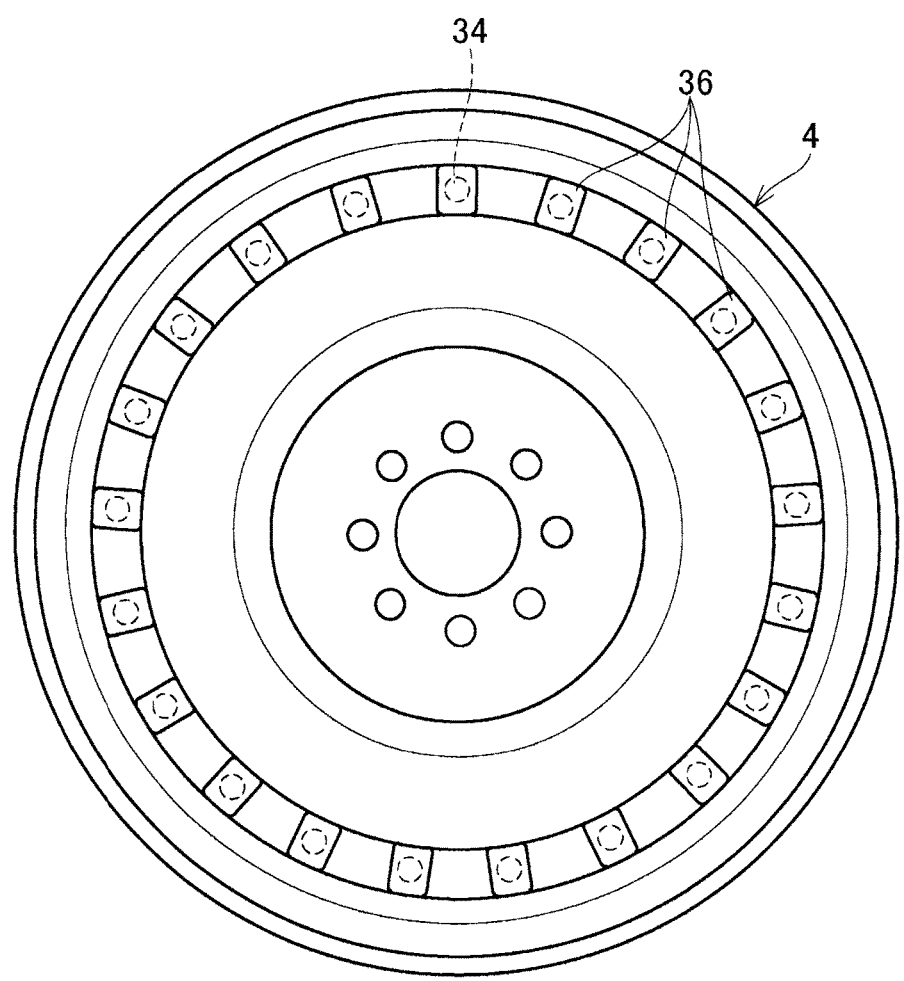
FIG. 4 is a front view of the flywheel according to the first illustrative example.
Figure 5:
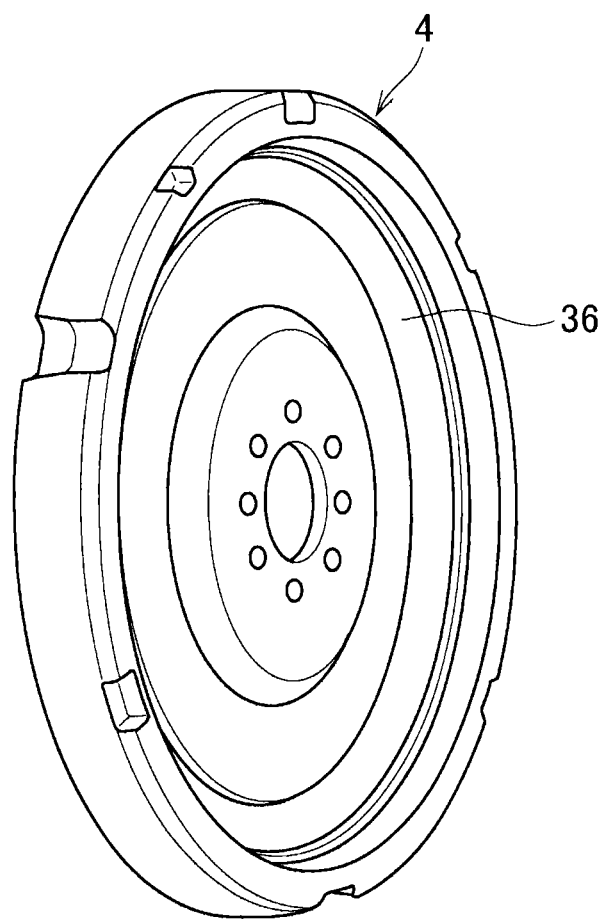
FIG. 5 is a perspective view of the flywheel according to another illustrative example.

However, the head 34 of the rivet 33 is projected from the housing plate 29, and the tail 35 of the rivet 33 is projected from the stopper plate 32. In order to prevent interference between the head 34 of the rivet 33 and the inner face 28 of the annular depression 27 of the flywheel 4, a chamber 36 for holding the head 34 of the rivet 33 is formed on the inner face 28. For example, the chamber 36 may be formed into a depression surrounding the head 34 of the rivet 33. In this case, a same number of the chambers 36 are formed on the inner face 28 of the annular depression 27 of the flywheel 4 at same intervals as the rivets 33, and as illustrated in FIG. 4, each of the chambers 36 has an opening width slightly wider than an outer diameter of the head 34 of the rivet 33. Alternatively, as illustrated in FIG. 5, the chamber 36 may also be formed into an annular depression having a width slightly wider than the outer diameter of the head 34 of the rivet 33. According to the illustrative examples, therefore, the head 34 of the rivet 33 can be prevented from being in contact with the flywheel 4. In addition, since the head 34 of the rivet 33 is held in the chamber 36 of the flywheel 4, an axial length, i.e., a thickness of the one-way clutch 5 can be shortened or thinned.

Turning back to FIG. 3, in order to prevent a rotation of the inner race 5a, an annular fixed plate 37 is arranged between the engine block 26 and the flywheel 4. Specifically, an outer circumferential portion of one of the faces of the fixed plate 37 is fixed to the engine block 26, while an outer circumferential end of the other face of the fixed plate 37 is fixed to a transmission case 38. An inner circumferential end of the fixed plate 37 is bent at a substantially right angle toward the flywheel 4 to form an end wall 39, and an inner circumferential face of the end wall 39 is splined to an inner edge of the inner race 5a to halt rotation of the inner race 5a.

Figure 1:
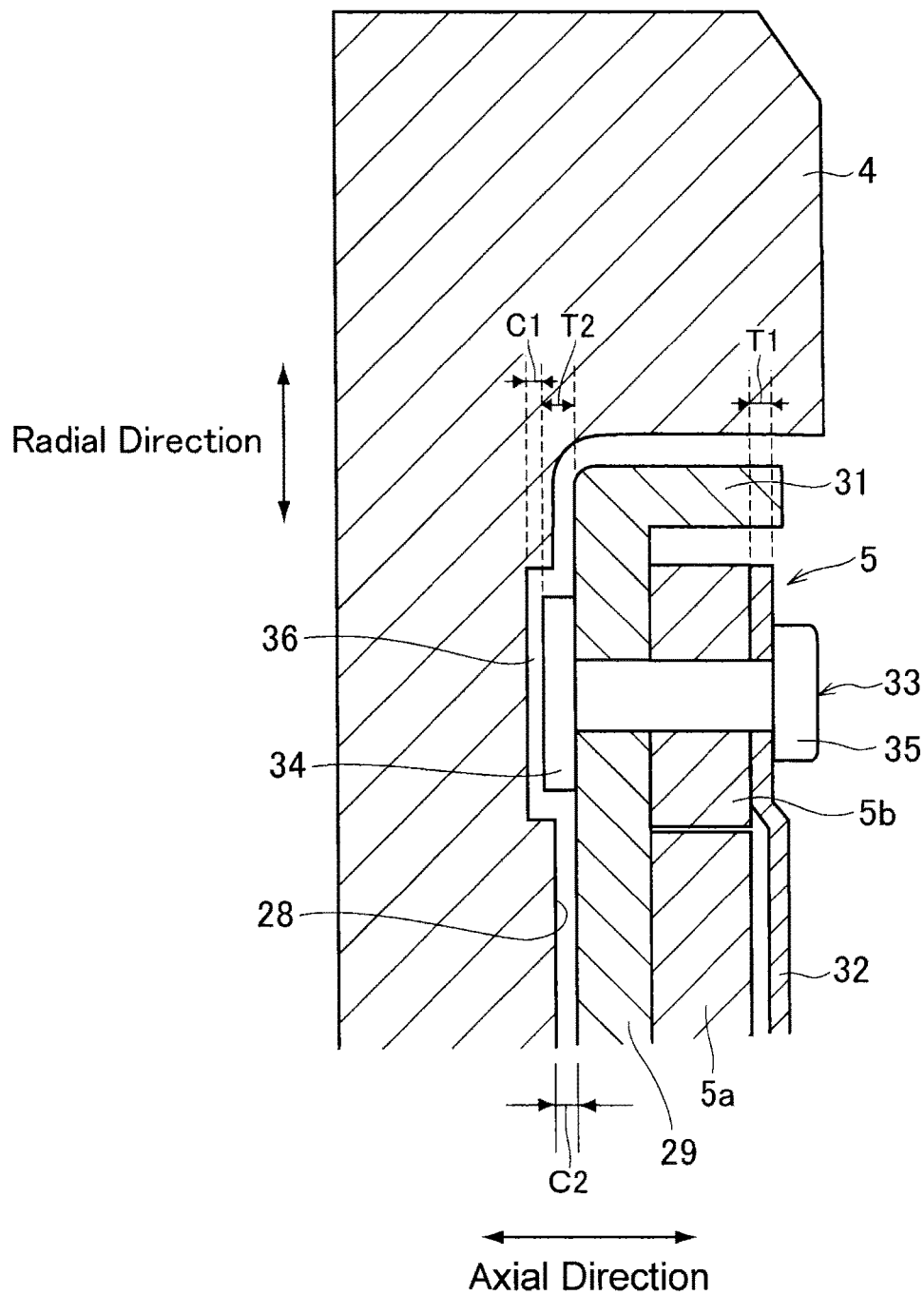
FIG. 1 is a partial cross-sectional view of the one-way clutch according to the illustrative example showing a structure around the rivet.

Turning to FIG. 1, there is shown a cross-section of the installation structure of the one-way clutch 5 including one of the rivets 33 in an enlarged scale. As described, the head 34 of the rivet 33 is held in the chamber 36 of the flywheel 4, and as shown in FIG. 1, a clearance C1 as a first clearance between a bottom face of the chamber 36 and a top face of the head 34 of the rivet 33 opposed thereto is narrower than a thickness T1 of the stopper plate 32. In addition, a clearance C2 as a second clearance between the inner face 28 of the annular depression 27 of the flywheel 4, except for a position at the chamber 36, and the housing plate 29 is narrower than a thickness T2 of the head 34 of the rivet 33.

In the one-way clutch 5, if the tail 35 is not expanded properly or if the tail 35 falls off or out, the rivet 33 may come out of the through holes of the housing plate 29, the outer race 5b and the stopper plate 32 toward the flywheel 4. In this situation, however, the head 34 of the rivet 33 comes into abutment with the bottom face of the chamber 36. That is, a displacement range of the rivet 33 is limited within the clearance C1 between the bottom of the chamber 36 and the top face of the head 34 that is narrower than the thickness T1 of the stopper plate 32 so that the tail end of the rivet 33 may remain within the through hole of the stopper plate 32. According to the illustrative examples, therefore, the stopper plate 32 is allowed to rotate integrally with the housing plate 29 and the outer race 5b even if the rivet 33 begins to come out of the through holes of those members, to prevent breakdown and malfunction of the one-way clutch 5.

By contrast, if the head 34 of the rivet 33 is sheared by the torque of the one-way clutch 5, the head 34 detached from the shaft of the rivet 33 will be centrifugally displaced radially outwardly. However, the clearance C2 between the inner face 28 of the flywheel 4 and the housing plate 29 is narrower than the thickness T2 of the head 34 so that the detached head 34 may remain in the chamber 36 of the flywheel 4. According to the illustrative examples, therefore, jamming of the rotary members will not be caused by the detached head 34 so that malfunction of the one-way clutch 5 can be prevented.

Although the disclosure herein has been described with reference to particular examples, it is to be understood that various modifications and alterations of this disclosure may be made. For example, a roller or a ball may be used to connect the inner race and the outer race instead of the sprag. In addition, the one-way clutch according to the illustrative examples may also be applied to the powertrains other than that shown in FIG. 6. Further, the installation structure according to the illustrative examples may also be applied to other kinds of clutches in which rotary members are selectively connected to enable torque transmission therebetween.

What is claimed is:

1. An installation structure of a one-way clutch in which torque transmission is limited to one direction, comprising:
    a flywheel;
    a fixed structure arranged coaxially with the flywheel while being connected to an engine block;
    a rotary structure arranged coaxially with the fixed structure while being connected to the flywheel;
    a housing plate disposed between the flywheel and the fixed and rotary structures and arranged coaxially while being connected to the rotary structure;
    a stopper plate attached to the rotary structure to hold the fixed structure with the housing, plate; and
    a rivet fastening the stopper plate, the rotary structure, and the housing plate;
    wherein a first clearance between one face of the flywheel and a top face of a head of the rivet is narrower than a thickness of the stopper plate.

2. The installation structure of a one-way clutch as claimed in claim 1, wherein a second clearance between the flywheel, except for at a portion of the flywheel opposed to the head of the rivet, and the housing plate is narrower than a thickness of the head of the rivet.

3. The installation structure of a one-way clutch as claimed in claim 1, further comprising:
    a chamber that is formed on the flywheel to hold the head of the rivet; and
    wherein the first clearance includes a clearance between a bottom face of the chamber and the top face of the head of the rivet.

* * * * *